United States Patent [19]

Kakiage

[11] Patent Number: 5,537,553
[45] Date of Patent: Jul. 16, 1996

[54] METHOD OF AND APPARATUS FOR BUS CONTROL AND DATA PROCESSOR

[75] Inventor: Toru Kakiage, Osaka, Japan

[73] Assignee: Matsushita Electric Industrial Co., Ltd., Osaka, Japan

[21] Appl. No.: 149,810

[22] Filed: Nov. 10, 1993

[30] Foreign Application Priority Data

Nov. 13, 1992 [JP] Japan ................................ 4-303357

[51] Int. Cl.⁶ ................................................ H01J 13/00
[52] U.S. Cl. ...................................... 395/280; 395/452
[58] Field of Search ............................. 395/325, 425, 395/309, 280, 440, 467, 450, 452, 453, 496, 306, 287

[56] References Cited

U.S. PATENT DOCUMENTS

| | | | |
|---|---|---|---|
| 4,933,835 | 6/1990 | Sachs et al. | 395/425 |
| 4,933,837 | 6/1990 | Freidin | 395/425 |
| 5,179,687 | 1/1993 | Hidaka et al. | 395/425 |
| 5,303,364 | 4/1994 | Mayer et al. | 395/425 |
| 5,335,336 | 8/1994 | Kametahi | 395/425 |
| 5,347,643 | 9/1994 | Kondo et al. | 395/425 |
| 5,353,415 | 10/1994 | Wolford et al. | 395/425 |

Primary Examiner—Jack B. Harvey
Assistant Examiner—Xuong M. Chung-Trans
Attorney, Agent, or Firm—Willian Brinks Hofer Gilson & Lione

[57] ABSTRACT

In a processor having a central processing unit, an instruction cache and a data cache, a bus controller is provided for controlling giving and receiving of a signal between internal instruction and data buses and external bus. Upon concurrent miss of instruction cache and data cache, the bus controller executes an external instruction access with priority in case where the external instruction access is a same page access as a previous external DRAM access, and executes an external data access in the other cases. Thereby, the cycle number required for the external access is reduced, while reducing the number of instruction execution cycles as a total.

12 Claims, 5 Drawing Sheets

METHOD OF AND APPARATUS FOR BUS CONTROL AND DATA PROCESSOR

BACKGROUND OF THE INVENTION

This invention relates to a high performance data processor capable of efficiently using a high speed access mode of an external memory device.

A dynamic random access memory (DRAM) is frequently used as an external memory device of a data processor. Some kinds of DRAM have a high speed access mode and a normal access mode. A page mode is well known as one of the high speed access mode. According to the page mode, sequential provision of pulses of a column address strobe signal (/CAS) while maintaining a row address strobe signal (/RAS) to low level makes high speed read/write operation possible, compared with the normal access mode which activates both /RAS and /CAS at every time. In other words, in case where the DRAM is accessed again with the same row address as that of a previous access, e.g. in case of page hit, high speed access is possible, compared with a case of page miss.

In general, in an external memory device, an instruction address space and a data address space are separated from each other. In the DRAM having the high speed access mode and the normal access mode, a data access subsequent to an instruction access and an instruction access subsequent to a data access are executed at normal speed with page miss. On the other hand, an instruction access subsequent to another instruction access and a data access subsequent to another data access are usually executed at high speed with page hit.

Some conventional processors have a central processing unit (CPU), an instruction cache and a data cache. In the processor of a pipeline operation with such an architecture, there is a case where the instruction cache and the data cache miss at a same CPU cycle, so that the instruction cache issues an external instruction access requirement and the data cache issues an external data access requirement. Conventionally, when the external instruction access requirement and the external data access requirement are issued concurrently, the external data access requirement is processed with priority without exception. Therefore, the high speed access mode of the external memory device cannot be used efficiently. A concrete example thereof is explained with reference to FIG. 5.

FIG. 5 is a time chart showing an example of a pipeline operation of a conventional processor having a CPU, an instruction cache and a data cache. Suppose that: the processor of this example is a RISC processor which executes one instruction in one CPU cycle basically; and the pipeline has four stages of instruction fetch stage, load stage, execution stage and store stage. According to the pipeline operation, when a preceding instruction proceeds to a further stage, instructions other than an instructions which cannot proceed in the pipeline owing to a cache miss or the like out of the subsequent instructions proceed to a further stage. Also, suppose that it takes three cycles in case of DRAM access of normal mode (page miss) and one cycle in case of DRAM access of high speed mode (page hit) to supply an instruction or a data to the CPU from the time at cache miss.

The pipeline operation and the external memory access operation are explained, referring to FIG. 5.

An instruction A, an instruction B, an instruction C, an instruction D and an instruction E are respectively executed in this order in the pipeline operation. The instruction A and the instruction B are instructions for reading a data into the CPU. At cycle 1 and cycle 2, respective instruction fetches for the instruction A and the instruction B are executed with instruction cache hit. A data cache access for the instruction A and an instruction cache access for the instruction C are executed at a same cycle of cycle When both the instruction cache and the data cache miss, an external instruction access requirement and an external data access requirement are respectively issued from the instruction cache and the data cache concurrently at the cycle 3. In this case, the access requirement for the preceding instruction, i.e. the external data access requirement of the instruction A is processed first, then the external instruction access requirement of the instruction C is processed.

Accordingly, the external data access that the instruction A requires starts at cycle 4. Suppose that a previous external access is an instruction access, the external access is executed at normal mode with page miss and is completed in three cycles of cycles 4, 5 and 6. At cycle 7, a data is supplied to the CPU, and the instruction A proceeds to the store stage and the subsequent instruction B proceeds to the execution stage. The instruction C stays on the instruction fetch stage since the instruction fetch therefor is not complete.

The external instruction access for the instruction C starts after the external data access for the instruction A is completed, namely starts at the cycle 7. In this case, the external instruction access for the instruction C is executed at the normal mode with page miss since the previous external access is the data access for the instruction A. Accordingly, the external instruction access for the instruction C is executed at cycles 7, 8, 9. The instruction C is supplied to the CPU at cycle 10, so that the instruction C proceeds to the load stage and the subsequent instruction D proceeds to the instruction fetch stage at cycle 10.

When the access to data cache for the preceding instruction B at cycle 7 misses, the external data access for the instruction B starts at the cycle 10 after the fetch for the instruction C from the external memory is completed. Since the previous external access is the fetch for the instruction, the external memory access is executed at the normal mode with page miss at cycles 10, 11, 12. The data is supplied to the CPU at cycle 13. The instruction B proceeds to the store stage and the subsequent instruction C proceeds to the execution stage at cycle 13. Wherein, since the instruction fetch for the instruction D is not completed owing to a cache miss of the instruction D at cycle 10, the instruction stays on the instruction fetch stage.

After the data fetch for the instruction B is completed, the external instruction access for the instruction D starts at cycle 13. In this case, since the previous external access is the data fetch, the external memory access is executed at the normal mode at cycles 13, 14, 15, so that the instruction D is supplied to the CPU at cycle 16. At the cycle 16 the instruction D proceeds to the load stage and the subsequent instruction E proceeds to the instruction fetch stage.

According to this example, the instruction D can proceed to the load stage at cycle 5 upon always hit of both the instruction cache and the data cache. Actually, however, as described above, the instruction D shall proceed thereto at cycle 16 owing to the miss, which is eleven-cycle delay.

SUMMARY OF THE INVENTION

The present invention has its object of providing a high performance processor with reduced cycle number of external access by efficiently using the high speed access mode of the external memory device.

To attain the above object, in the present invention, out of the plural concurrently-issued external access requirements, an external access requirement which can access the external memory device at the high speed access mode is processed with priority. The possibility of access at the high speed access mode depends on a previous external access address. In detail, the external instruction access requirement is processed with priority when the external instruction access is the same page access as a previous DRAM access upon concurrent misses of instruction cache and data cache.

Further, during a period when no external access requirements is issued, an instruction or a data is pre-fetched from the external memory device with an address that a previous external access address is updated by a set value. An external access requirement which can use a pre-fetched instruction or data is processed with priority, if any.

According to the present invention, the efficient use of the high speed access mode of the external memory device reduces the number of cycles required for the external access, while improving the performance of the processor. Also, the efficient use of the period when no external access requirements is issued further reduces the number of cycles required for the external access, improving the performance of the processor.

DETAILED DESCRIPTION OF PREFERRED EMBODIMENTS

Description is made below about a data processor according to embodiments of the present invention, with reference to accompanying drawings.

FIRST EMBODIMENT

Figure 1:
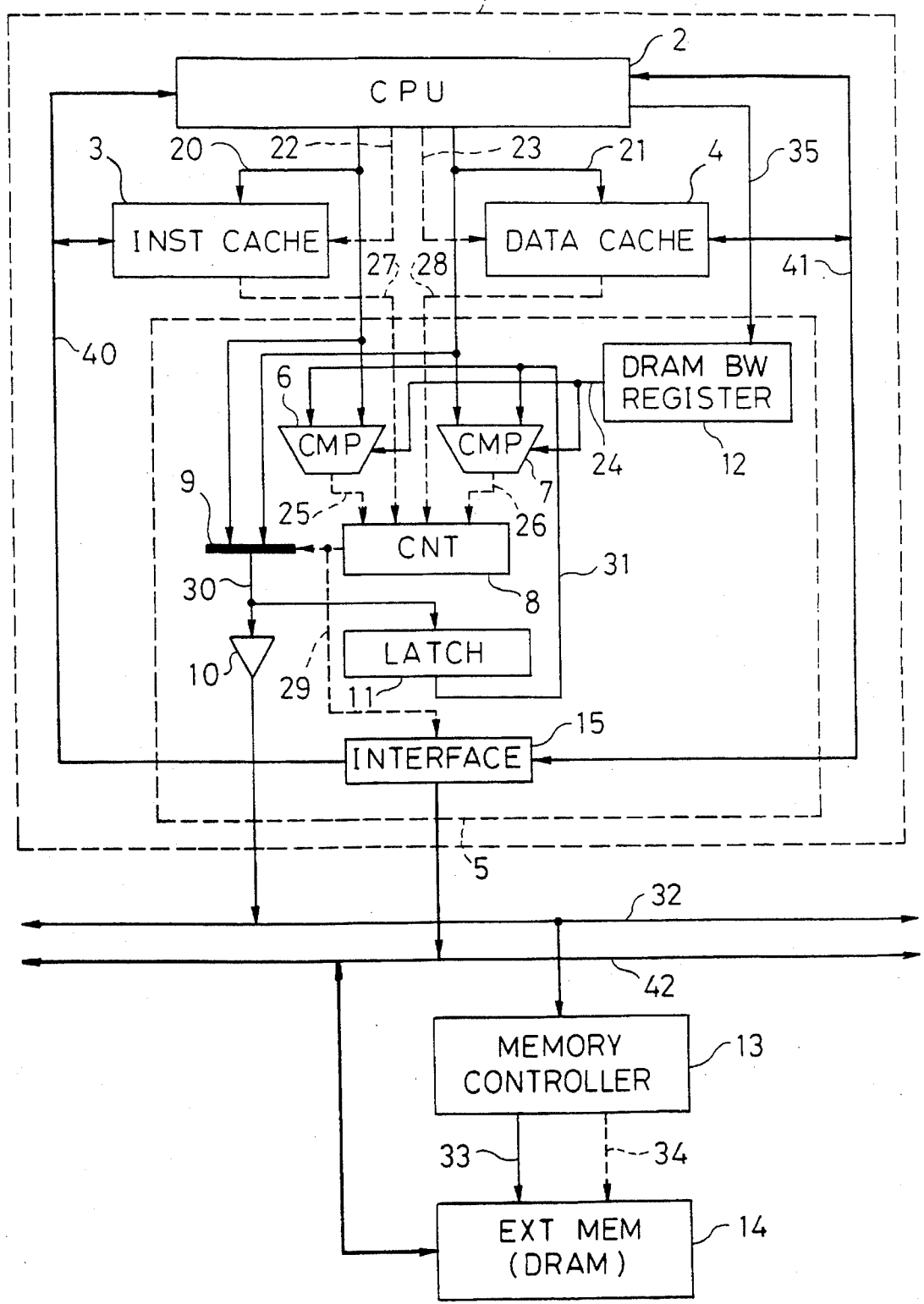
FIG. 1 is a block diagram showing an inside construction of a processor and an external connection thereto according to a first embodiment of the present invention.

FIG. 1 is a block diagram showing an inside construction of a processor and an external connection thereto according to the first embodiment of the present invention. In FIG. 1, a processor 1 is a RISC processor provided with a central processing unit (CPU) 2, an instruction cache 8, a data cache 4 and a bus controller 5, and executes one instruction in one CPU cycle basically. The pipeline has four stages of an instruction fetch stage, load stage, execution stage and store stage.

A DRAM 14 employed as an external memory device of the processor 1 is connected to the processor 1 via an address bus 32 and an instruction/data bus 42. A memory controller 13 is intervened between the address bus 32 and the DRAM 14, and supplies a multiplex address 33 and an access control signal 34 to the DRAM 14. The multiplex address 33 is an address AD on the address bus 32 which is multiplexed to a row address (upper part of AD) and a column address (lower part of AD) for access to the DRAM 14. The access control signal 34 includes a row address strobe signal (/RAS), a column address strobe signal (/CAS) and the like. The memory controller 13 generates an access control signal 34 so as to correspond to respective kinds of DRAM access mode, such as normal access mode, high speed access mode, refresh mode. As the high speed access mode, there are page mode, static column mode and the like. In case where a row address is the same as a previous access, a high speed DRAM access is possible at any high speed access modes.

The processor 1 is further provided with an internal instruction bus 40 and an internal data bus 41. The CPU 2 outputs an instruction access requirement 22 together with an instruction address 20 and a data access requirement 23 together with a data address 21 respectively. The instruction cache 3 is means for storing an instruction to be executed in the CPU 2 and issues an external instruction access requirement 27 upon a miss to the instruction access requirement 22. The data cache 4 is means for storing a data to be used in the CPU 2 and issues an external data access requirement 28 upon a miss to the data access requirement 23.

The bus controller 5 is means for controlling giving and receiving of a signal between the instruction/data bus 42 and one of the internal instruction bus 40 and the internal data bus 41, and is provided with first and second comparators 6, 7, a control circuit 8, a selector 9, an output tri-state buffer 10, an address latch 11, a DRAM bit width store register 12 and a bus interface 15.

The selector 9 selects one of the instruction address 20 and the data address 21 according to an address selection signal 29 outputted from the control circuit 8. Reference numeral 30 denotes an external access address selected by the selector 9. The output tri-state buffer 10 buffers and outputs the selected external access address 30 to the address bus 32. The address latch 11 memorizes a previous external access address. Reference numeral 31 denotes a previous external access address outputted from the address latch 11.

The first comparator 6 compares the instruction address 20 with the previous external access address 31 outputted from the address latch 11. The second comparator 7 compares the data address 21 with the previous external access address 31 outputted from the address latch 11. Wherein, respective comparison ranges in both comparators 6, 7 are restricted by a bit width data 24 indicating to which part of the instruction address 20 and the data address 21 a row address of the DRAM 14 corresponds. The bit width data 24 is outputted from the DRAM bit width store register 12. The CPU 2 sets the bit width data 24 into the DRAM bit width store register 12 via a write bus 35 by executing a write instruction. Reference numeral 25 denotes a compared result of the first comparator 6 and 26 denotes a compared result of the second comparator 7.

The control circuit 8 decides whether the external instruction access is to be executed or the external data access is to be executed according to the compared results 25, 26 of first and second comparator 6, 7, the external instruction access requirement 27 and the external data access requirement 28 to supply the address selection signal 29 to the selector 9 and the bus interface 15. The bus interface 15 governs giving and receiving of instruction and data between the instruction/data bus 42 and one of the internal instruction bus 40 and the internal data bus 41 according to the address selection signal 29.

Pipeline operation of the processor 1 with the above construction is discussed first.

On the instruction fetch stage of first stage, the CPU 2 outputs the instruction address 20 and the instruction access requirement 22 to execute the access to instruction cache 3. Upon hit of instruction cache 3, an instruction is read out from the instruction cache 3 onto the internal instruction bus 40 to supply to the CPU 2. Then, the pipeline operation proceeds to the load stage.

Upon miss of instruction cache 3, however, the external instruction access requirement 27 is sent from the instruction cache 3 to the bus controller 5. According to the external instruction access requirement 27, the control circuit 8 in the bus controller 5 controls the selector 9 so as to execute an external instruction access to the DRAM 14. In detail, the instruction address 20 is selected by the selector 9 according to the address selection signal 29 outputted from the control circuit 8 and the external access address 30 is outputted to the address bus 32 via the output tri-state buffer 10, thereby the external access starts. In case of external access unachievable such as that a previous external access is not completed, that a device other than the processor 1 uses the external bus (address bus 32 and instruction/data bus 42), the processor 1 starts the external access after the external bus is released.

When the external access starts, the memory controller 3 generates the multiplex address 33 and the access control signal 34 to execute an access to the DRAM 14. The instruction read out onto the instruction/data bus 42 from the DRAM 14 is outputted onto the internal instruction bus 40 by the bus interface 15 to be forwarded to the CPU 2. The instruction fetched from the DRAM 14 in this way is written into the instruction cache 3 at the same time as it is forwarded to the CPU 2 so as to execute following instruction accesses at high speed.

After the instruction fetch is completed, the CPU 2 proceeds to the load stage of second stage. The instruction is decoded on the load stage.

On the execution stage of third stage, the instruction is executed. For example, if the instruction is an instruction for reading a data, the data address 21 and the data access requirement 23 are outputted from the CPU 2 to execute an access to the data cache 4. Upon hit of the data cache 4, the data is read out from the data cache 4 onto the internal data bus 41 and supplied to the CPU 2. Then, the pipeline operation proceeds to the store stage.

Upon miss of the data cache 4, however, the data cache 4 sends the external data access requirement 28 to the bus controller 5. According to the external data access requirement 28, the control circuit 8 in the bus controller 5 controls the selector 9 so as to execute the external data access to the DRAM 14. In detail, the selector 9 selects the data address 21 according to the address selection signal 29 outputted from the control circuit 8, so that the external access starts as well as the case of instruction cache miss, and the data is read out from the DRAM 14 onto the instruction/data bus 42 via the memory controller 13. The data read out to the instruction/data bus 42 is outputted to the internal data bus 41 by the bus interface 15 and is forwarded to the CPU 2. The data fetched from the DRAM 14 in this way is written into the data cache 4 at the same time as it is forwarded to the CPU 2 so as to execute following data accesses at high speed.

After the data fetch is completed, the CPU 2 proceeds to the store stage of fourth stage. On the store stage, the data read out from the data cache 4 or the DRAM 14 is stored into a register in the CPU 2, thus terminating the one instruction.

As described above, an instruction access requirement 22 is asserted at a cycle for executing an instruction fetch in the CPU 2 and a data access requirement 23 is asserted at a cycle for executing a data access. Then, the instruction cache 3 reads out an instruction corresponding to the instruction address 20 and the data cache 4 reads out a data corresponding to the data address 21. At this time, the instruction is supplied from the instruction cache 3 to the CPU 2 via the internal instruction bus 40 upon hit of the instruction cache 3, and the data is supplied from the data cache 4 to the CPU 2 via the internal data bus 41 upon hit of the data cache 4. The external instruction access requirement 27 upon miss of the instruction cache 3 and the external data access requirement 28 upon miss of the data cache 4 are respectively forwarded to the bus controller 5 to execute access to the DRAM 14.

Since the processor 1 is in the pipeline operation, the external instruction access requirement 27 and the external data access requirement 28 may be issued at a same CPU cycle. The operation in this case is discussed next.

When the external instruction access requirement 27 and the external data access requirement 28 are issued at the same time, the first comparator 6 compares the previous external access address 31 with the instruction address 20 and the second comparator 7 compares the previous external access address 31 with the data address 21 in the bus controller 5. Each comparison is executed only for a bit of a set region according to the respective bit-width data 24 so as to judge whether the DRAM 14 can be accessed at the high speed mode. Then in the control circuit 8, an external access which is accessible at the high speed mode is processed with priority based on the compared results 25, 26 of first and second comparators 6, 7. The priority order is indicated in Table 1. The compared results 25, 26 respectively becomes "1" upon conformity.

TABLE 1

| | compared result 25 of comparator 6 | compared result 26 of comparator 7 | order of external access |
|---|---|---|---|
| CASE 1 | 0 | 0 | (1)data (2)inst. |
| CASE 2 | 0 | 1 | (1)data (2)inst. |
| CASE 3 | 1 | 0 | (1)inst. (2)data |
| CASE 4 | 1 | 1 | (1)data (2)inst. |

As indicated in Table 1, when the conformity is obtained at only the first comparator 6 out of first and second comparators 6, 7, the external instruction access is executed prior to the external data access. In the other cases, the external data access for a preceding instruction is executed with priority as the instruction order. Accordingly, the high speed access mode of the DRAM 14 can be efficiently used, which is described with reference to FIG. 2.

Figure 2:
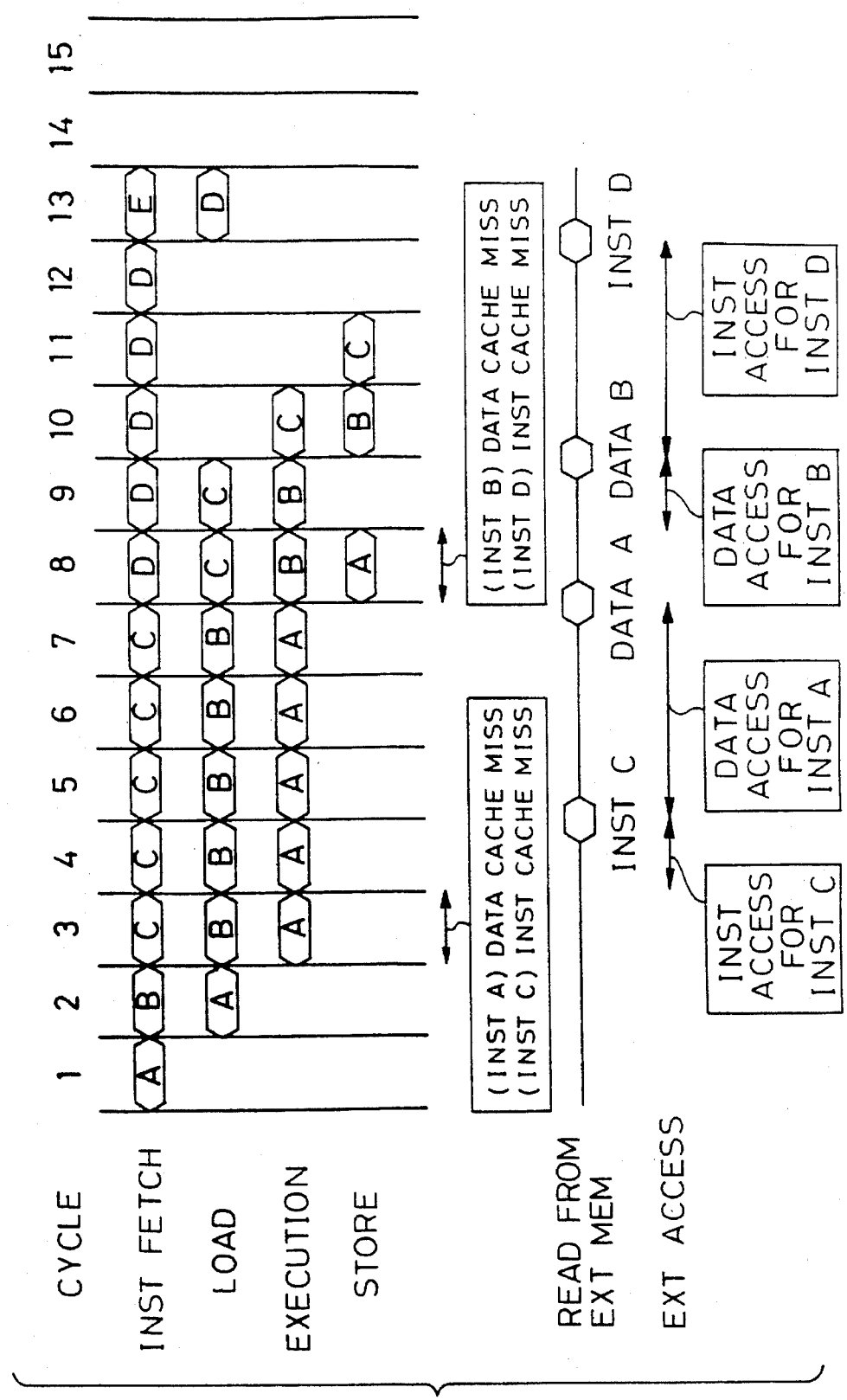
FIG. 2 is a time chart showing an example of a pipeline operation of the processor in FIG. 1.

FIG. 2 is a time chart showing an example of pipeline operation of the processor 1 in FIG. 1. As well as in the conventional example, suppose that: when a preceding instruction proceeds to a further stage, instructions other than an instruction which cannot proceed in the pipeline owing to a cache miss or the like out of the subsequent instructions proceed to a further stage; and it takes three cycles in case of DRAM access at the normal mode (page miss) and one cycle in case of DRAM access at the high speed mode (page hit) to supply the instruction or the data to the CPU 2 from the time at cache miss.

Referring to FIG. 2, the pipeline operation and the external memory access operation of the processor 1 in FIG. 1 are described below.

An instruction A, an instruction B, an instruction C, an instruction D and an instruction E are respectively executed in this order in the pipeline operation. Suppose that the instruction A and the instruction B are instructions for reading a data into the CPU 2. At cycles 1 and 2, the instruction fetches for the instruction A and the instruction B are respectively executed with instruction cache hit. An access to the data cache 4 for the instruction A and an access to the instruction cache 3 for the instruction C are executed at the same cycle 3.

Then, in case of both misses of instruction cache 3 and the data cache 4, the external instruction access requirement 27 and the external data access requirement 28 are issued to the bus controller 5 at the cycle 3. If a previous external access is an instruction access, only the instruction address 20 out of the instruction address 20 and the data address 21 conforms at a row address part to the previous external access address 31 (page hit). Thus, the external instruction access for the instruction C is executed prior to the data access for the instruction A (CASE 3 in Table 1). At this time, since the DRAM 14 is accessible at the high speed mode, the external memory access is completed in one cycle of cycle 4, thus obtaining the instruction C to be fetched. At cycle 5, the instruction C is supplied to the CPU 2 and written into the instruction cache 3. However, since the data access for the preceding instruction A is not completed, the pipeline operation cannot proceed.

Continuously, the external data access for the instruction A is executed. While, since the previous access is the external instruction access and does not conform thereto at the row address part, the external data access for the instruction A is executed at the normal mode, which takes three cycles of cycles 5, 6, 7. Then, at cycle 8, the data is supplied to the CPU 2 and is written into the data cache 4. Since the fetch for the instruction C is already completed, all of the instructions proceed to the next stage.

At the cycle 8, suppose that: the access to the data cache 4 for the instruction B and the access to the instruction cache 3 for the instruction D are executed; and both caches 3, 4 miss again. In this time, since the previous access is the external data access for the instruction A, only the data address 21 out of the instruction address 20 and the data address 21 conforms at the row address part to the previous external access address 31 (page hit). Thus, the external data access for the instruction B is executed with priority (CASE 2 in Table 1). At this time, since the DRAM 14 is accessible at the high speed mode, the external memory access is completed in one cycle of cycle 9, thus obtaining a data to be fetched. At cycle 10, the data is supplied to the CPU 2 and is written into the data cache 4, so that the instruction B and the instruction C proceed to the next stage. Wherein, the fetch for the instruction D is not completed, staying on the instruction fetch stage.

Continuously, the external instruction access for the instruction D is executed. While, since the previous access is the external data access and does not conform thereto at the row address part, the external instruction access for the instruction D is executed at the normal mode, which takes three cycles of cycles 10, 11, 12 at the normal mode. Then, at cycle 13, the instruction D is supplied to the CPU 2 and is written into the instruction cache 3, so that the instruction D proceeds to the load stage and the subsequent instruction E proceeds to the instruction fetch stage.

Figure 5:
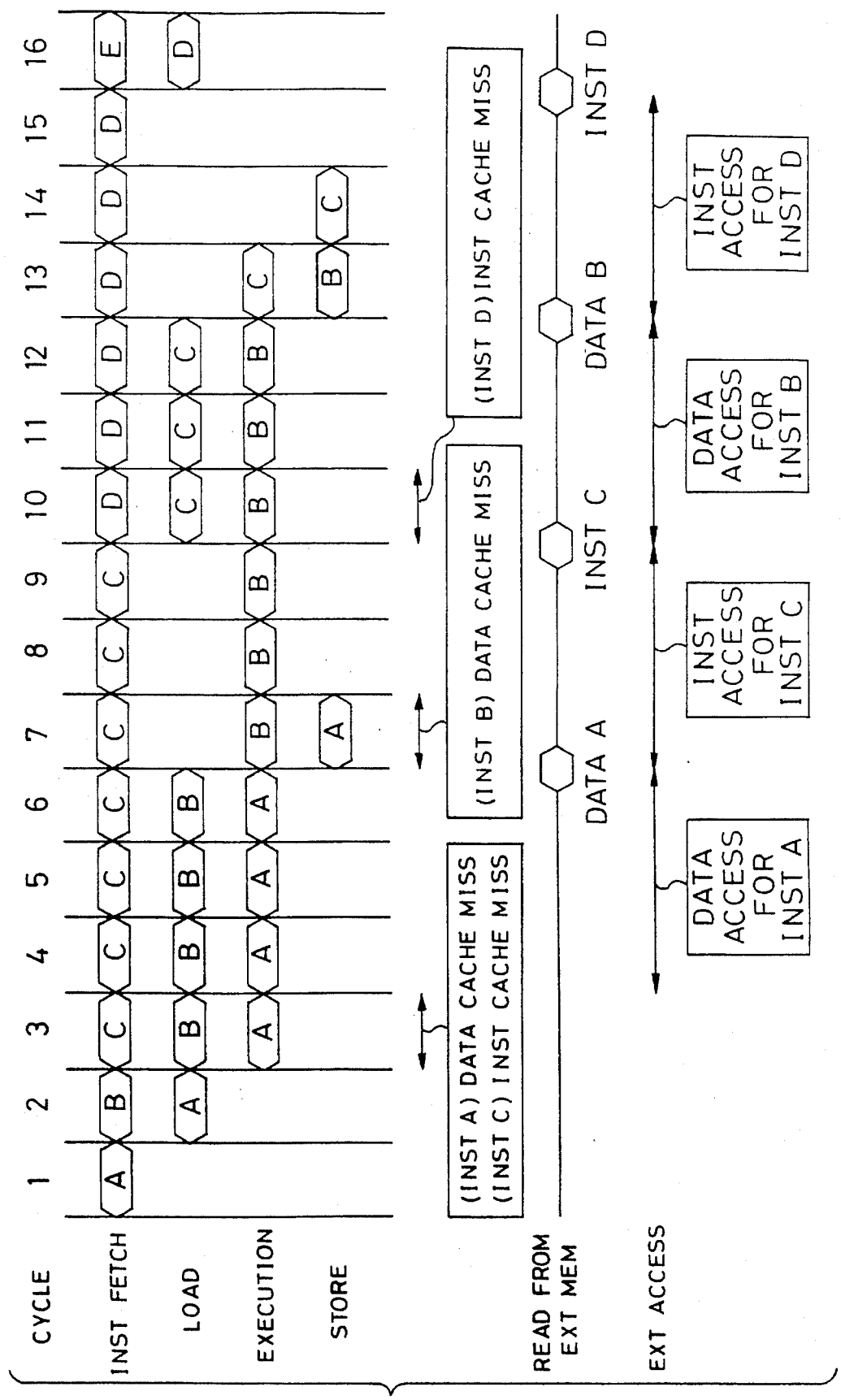
FIG. 5 is a time chart showing an example of a pipeline operation of a conventional processor.

As discussed above, according to this embodiment, the instruction D proceeds to the load stage at cycle 13, which is three-cycle less than the conventional one which requires 16 cycles. In other words, the same instruction group as in FIG. 5 is executed in high speed, enhancing the performance of the processor 1.

SECOND EMBODIMENT

Figure 3:
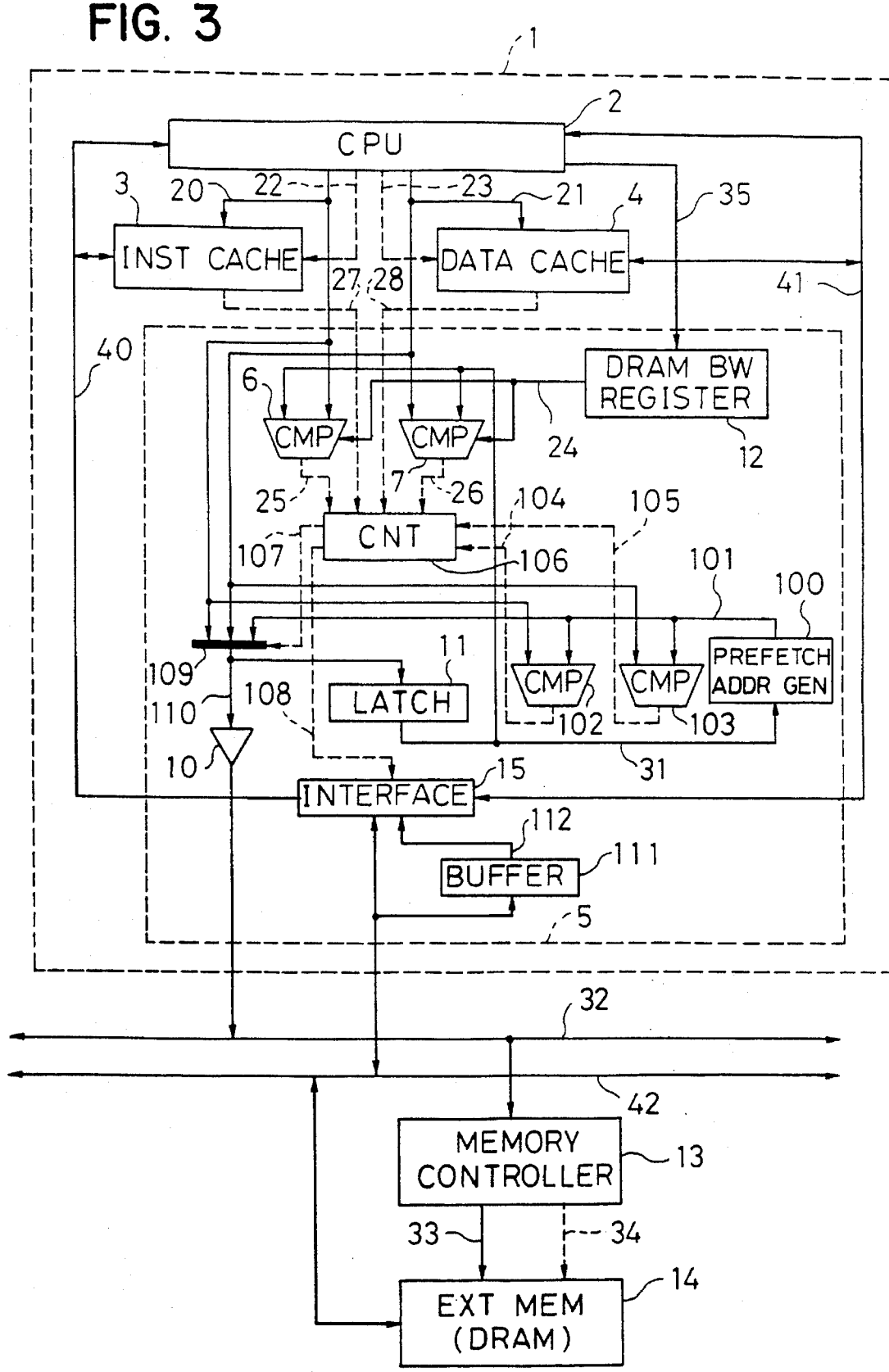
FIG. 3 is a block diagram showing an inside construction of a processor and an external connection thereto according to a second embodiment of the present invention.

FIG. 3 is a block diagram showing an inside construction of a processor and an external connection thereto according to the second embodiment of the present invention. In FIG. 3, as far as is possible the same reference numerals have been used as in FIG. 1 of the first embodiment, leaving out the explanation thereof.

In FIG. 3, the bus controller 5 is provided with a pre-fetch address generating circuit 100, third and fourth comparators 102, 103, a control circuit 106, a selector 109 and a buffer memory 111.

The pre-fetch address generating circuit 100 generates, as a pre-fetch address, an address that the previous external access address 31 outputted from the address latch 11 is incremented by a set value. Reference numeral 101 denotes a pre-fetch address generated by the pre-fetch address generating circuit 100. For example, in case of four-byte instruction/data width to be dealt with, the pre-fetch address generating circuit 100 generates the pre-fetch address 101 by adding 4 to the previous external access address 31.

Different from the selector 9 in FIG. 1, the selector 109 in this embodiment is a three-input selector and selects one of the instruction address 20, the data address 21 and the pre-fetch address 101 according to an address selection signal 107 outputted from the control circuit 106. Reference numeral 110 denotes an external access address selected by the selector 109. The buffer memory 111 is means for storing an instruction or a data pre-fetched from the DRAM 14, using the pre-fetch address 101, during the period when none of the external instruction access requirement 27 and the external data access requirement 28 is issued. Since the pre-fetch external access has the same row address as that of the previous external access in almost cases, the access to the DRAM 14 is executed at the high speed mode. Reference numeral 112 denotes an instruction or a data stored in the buffer memory 111.

Third and fourth comparators 102, 103 are means for judging whether the instruction or the data stored in the buffer memory 111 can be used. The third comparator 102 compares the instruction address 20 with the pre-fetch address 101. The fourth comparator 103 compares the data address 21 with the pre-fetch address 101. Reference numeral 104 is a compared result of the third comparator 102 and 105 is a compared result of the fourth comparator 103.

The control circuit 106 in this embodiment has a function of supplying the address selection signal 107 to the selector 109 so that the instruction or the data is stored into the buffer memory 111 during the period when none of the external instruction access requirement 27 and the external data access requirement 28 is issued. The control circuit 106 also has a function of supplying an instruction/data selection signal 108 to the bus interface 15 so as to transmit the instruction stored in the buffer memory 111 to the internal instruction bus 40 regardless of the compared results 25, 26 of first and second comparators 6, 7 upon conformity at the third comparator 102 and so as to transmit the data stored in the buffer memory 111 to the internal data bus 41 regardless of the compared results 25, 26 of first and second comparators 6, 7 upon conformity at the fourth comparator 103. Further, the control circuit 106 has a function of supplying the address selection signal 107 to the selector 109 and the instruction/data selection signal 108 to the bus interface 15 respectively, judging whether the external instruction access is to be executed or the external data access is to be executed according to the compared results 25, 26 of first and second comparators 6, 7, the external instruction access requirement 27 and the external data access requirement 28, as well as in the first embodiment.

According to the bus controller 5 in this embodiment with the above construction, the first comparator 6 compares the instruction address 20 with the previous external access address 31, the second comparator 7 compares the data address 21 with the previous external access address 31, the third comparator 102 compares the instruction address 20 with the pre-fetch address 101, and the fourth comparator 103 compares the data address 21 with the pre-fetch address 101.

Upon the conformity at the third comparator 102 when only the external instruction access requirement 27 is issued out of the external instruction access requirement 27 and the external data access requirement 28, the instruction 112 stored in the buffer memory ill-is outputted onto the internal instruction bus 40 and supplied to the CPU 2 since the instruction required by the CPU 2 is already pre-fetched and stored in the buffer memory 111. Upon no conformity at the third comparator 102 when only the external instruction access requirement 27 is issued out of the external instruction access requirement 27 and the external data access requirement 28, the external access to the DRAM 14 is executed using the instruction address 20.

Upon conformity at the fourth comparator 103 when only the external data access requirement 28 is issued out of the external instruction access requirement 27 and the external data access requirement 28, the data 112 stored in the buffer memory 111 is outputted onto the internal data bus 41 and supplied to the CPU 2 since the data required by the CPU 2 is already pre-fetched and stored in the buffer memory 111. Upon no conformity at the fourth comparator 103 when only the external data access requirement 28 is issued out of the external instruction access requirement 27 and the external data access requirement 28, the external access to the DRAM 14 is executed using the data address 21.

Upon conformity at the third comparator 102 when the external instruction access requirement 27 and the external data access requirement 28 are concurrently issued, the instruction 112 stored in the buffer memory 111 is supplied to the CPU 2 via the internal instruction bus 40 and the external data access is executed regardless of the compared results 25, 26 of first and second comparators 6, 7. Upon conformity at the fourth comparator 103 when the external instruction access requirement 27 and the external data access requirement 28 are concurrently issued, the data 112 stored in the buffer memory 111 is supplied to the CPU 2 via the internal data bus 41 and the external instruction access is executed regardless of the compared results 25, 26 of first and second comparators 6, 7. Also, upon no conformity at third and fourth comparators 102, 103 when the external instruction access requirement 27 and the external data access requirement 28 are concurrently issued, the external access is executed in the priority order based on the compared results 25, 26 of first and second comparator 6, 7 according to Table 1, as well as in the first embodiment.

Figure 4:
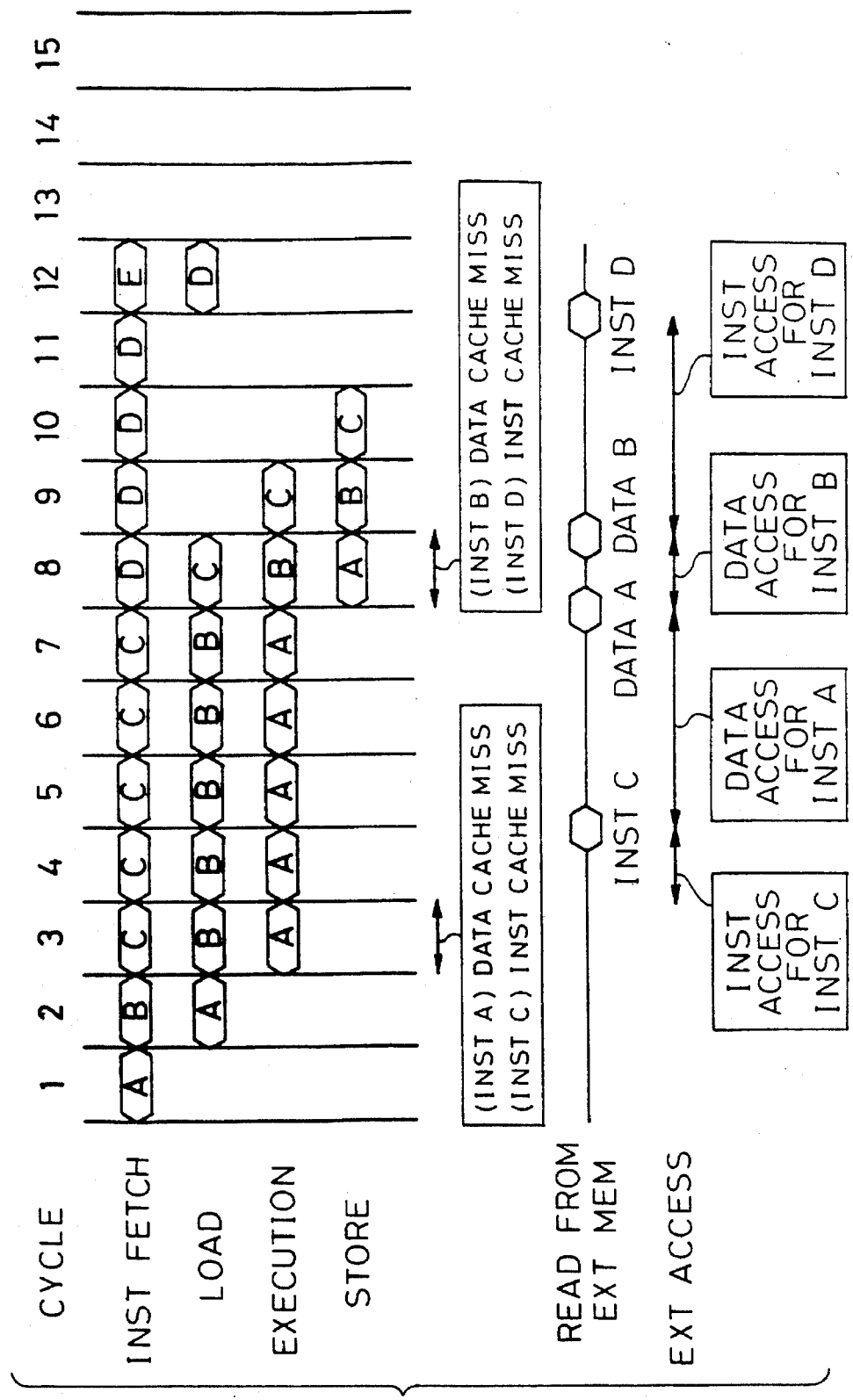
FIG. 4 is a time chart showing an example of a pipeline operation of the processor in FIG. 3.

With reference to FIG. 4, discussed is about that the high speed access mode of the DRAM 14 is further efficiently used by introducing the pre-fetch in this embodiment.

FIG. 4 is a time chart showing an example of the pipeline operation of the processor 1 in FIG. 3. As well as in the conventional example and the first embodiment, suppose that: instructions other than an instruction which cannot proceed in the pipeline owing to a cache miss or the like out of the subsequent instructions proceeds to a further stage when a preceding instruction proceeds to a further stage; and it takes three cycles in case of DRAM access at the normal mode (page miss) and one cycle in case of DRAM access at the high speed mode (page hit) to supply the instruction or the data to the CPU 2 from the time at cache miss.

The pipeline operation and the external memory access operation in the processor 1 in FIG. 3 are discussed, with reference to FIG. 4.

An instruction A, an instruction B, an instruction C, an instruction D and an instruction E are respectively executed in this order in the pipeline operation. Suppose that the instruction A and the instruction B are instructions for reading a data into the CPU 2. At cycles 1 and 2, the instruction fetches for the instruction A and the instruction B are respectively executed with the instruction cache hit. Further, the access to the data cache 4 for the instruction A and the access to the instruction cache 3 for the instruction C are executed at the same cycle 3.

Upon misses of the instruction cache 3 and the data cache 4, the external instruction access requirement 27 and the external data access requirement 28 are issued to the bus controller 5 at the cycle 3. If the instruction address 20 and the data address 21 do not conform to the pre-fetch address 101, only the instruction address 20 out of the instruction address 20 and the data address 21 conforms at the row address part to the previous external access address 31 when the previous external access is an instruction access, so that the external instruction access for the instruction C is executed prior to the data access for the preceding instruction A (CASE 3 in Table 1). At this time, since the DRAM 14 is accessible at the high speed mode, the external memory access is completed in one cycle of cycle 4, thus obtaining the instruction C to be fetched. At cycle 5, the instruction C is supplied to the CPU 2 and is written into the instruction cache 3. However, since the data access for the preceding instruction A is not completed, the pipeline operation cannot proceed to the next stage.

Continuously, the external data access for the instruction A is executed and completed in three cycles of cycles 5, 6, 7 at the normal mode since the previous access is the external instruction access and does not conform thereto at the row address part. Then, the data is supplied to the CPU 2 and is written into the data cache 4 at cycle 8.

Each instruction proceeds to the next stage at cycle 8. Since no external access requirement is present at the cycle 8, the data is pre-fetched with the next address subsequent to the address of the data A (address generated by the pre-fetch address generating circuit 100). The external access is completed in one cycle because the previous external access is a data access, so that the pre-fetch data is stored into the buffer memory 111 at cycle 9.

Also, the access to the data cache 4 for the instruction and the access to the instruction cache 3 for the instruction D are executed at the cycle 8. With misses of both caches 3,4, the external instruction access requirement 27 and the external data access requirement 28 are concurrently issued. At this time, the conformity of the data address 21 to the pre-fetch address 101 is detected by the fourth comparator 103, and the data 112 stored in the buffer memory 111 is supplied to the CPU 2 at the cycle 9. Then, the instruction B and the instruction C proceed to the next stage.

Further, since the requirement of the instruction fetch for the instruction D remains, the external instruction access for the instruction D starts at the cycle 9. This access is executed at the normal mode and is completed in three cycles of cycles 9, 10, 11 since the previous access is the external data access and does not conform thereto at the row address part. Then, at cycle 12, the instruction D is supplied to the CPU 2 and is written into the instruction cache 3 so that the instruction D proceeds to the load stage and the subsequent instruction E proceeds to the instruction fetch stage.

As described above, according to the second embodiment, the instruction D proceeds to the load stage at cycle 12 in contrast to the first embodiment at cycle 13 which means one-cycle reduction. In other words, the same instruction group as in FIG. 2 is executed in higher speed, enhancing the performance of the processor 1.

In first and second embodiments, the DRAM 14 is employed as the external memory device. But the same construction as in FIGS. 1 and 3 is possible in case where another memory device having a high speed access mode such as burst mode SRAM is employed. Also, the instruction cache 8 and the data cache 4 are built in the processor 1 in the embodiments, but the caches may be provided outside of the processor 1. In addition, the bit width data may be set directly to the DRAM bit width store register 12 via external pins of the processor 1.

I claim:

1. A method for controlling communications between a plurality of internal buses of a data processor and a single external bus connected to an external memory device having a high speed access mode and a normal access mode, wherein the plurality of internal buses includes an internal instruction bus and an internal data bus, the external memory device stores information, including instructions and data, identifiable by external access addresses, and the data processor further comprises a CPU and an internal memory for storing a previous external access address of information previously accessed from the external memory device, wherein the communication control method comprises the steps of:

receiving communications from the CPU requesting information stored in the external memory device, comprising a plurality of external access requirements corresponding to the plurality of internal buses, including an external instruction access requirement corresponding to the internal instruction bus and an external data access requirement corresponding to the internal data bus;

comparing, with the previous external access address stored in the internal memory, an external access address of information requested by each of the plurality of external access requirements, including the external instruction access requirement and the external data access requirement, judging, for each of the plurality of external access requirements, whether the external memory device is accessible at the high speed mode, based on the comparison results with the previous external access address;

selecting, from the plurality of external access requirements, an external access requirement to be processed with priority, based on the judged results of whether information requested by an external access requirement can be accessed from the external memory device at the high speed access mode, wherein if the external instruction access requirement and the external data access requirement are concurrently issued, the external instruction access requirement is selected if the judging results indicate that the external memory device is accessible at the high speed access mode for the external instruction access requirement but not for the external data access requirement, but otherwise, the external data access requirement is selected access requirement is selected; and processing with priority the selected external access requirement by enabling the communication between the internal bus corresponding to the selected external access requirement and the external bus connected to external memory device.

2. The bus controlling method according to claim 1, further comprising the steps of:

pre-fetching information stored in the external memory device at an external access address calculated by incrementing the previous external access address by a predetermined value during a period when no external access requirements are issued;

judging whether the pre-fetched information corresponds to the information requested by each of the plurality of external access requirements; and processing with priority an external access requirement which can use the pre-fetched information based on the judged result.

3. A bus controller for controlling communications between a plurality of internal buses of a data processor and a single external bus connected to an external memory device having a high speed access mode and a normal access mode, wherein the plurality of internal buses includes an internal instruction bus and an internal data bus, and a communication comprises an external access requirement corresponding to an internal bus requesting information identified by an external access address and stored in the external memory device, wherein the bus controller comprises:

first memory means for memorizing a previous external access address of information previously accessed from the external memory device;

comparison means for comparing an external access address of information requested by the plurality of external access requirements with the previous external access address memorized in the first memory means, including a first comparison means for comparing an external access address of information requested by the external instruction access requirement with the previous external access address, and a second comparison means for comparing an external access address of information requested by the external data access requirement with the previous external access address;

first judging means for judging, based on the first comparison results, whether the external memory device is accessible at the high speed access mode for each of the plurality of external access requirements; and selection means for selecting an external access requirement to be processed with priority, based on the results of the first judging means;

first bus interface means for controlling communication between the plurality of internal buses and the external bus by enabling the communication of the selected external access requirement between the internal bus corresponding to the selected external access requirement and the external bus connected to the external memory device; and first control means for controlling the selection means and the first bus interface means, wherein if the external instruction access requirement and the external data access requirement are concurrently issued, the external instruction access requirement is selected if the first judging means determines that the external memory device is accessible at the high speed access mode for the external instruction access requirement but not for the external data access requirement, but otherwise, the external data access requirement is selected access requirement is selected.

4. The bus controller according to claim 3, wherein the external memory device comprises a DRAM and the bus controller further comprises second memory means for memorizing bit width data indicating which bits of an external instruction access address and an external data access address correspond to an address of the DRAM employed as the external memory device, and wherein the first comparison means and said second comparison means use the bit width data stored in the second memory device to respectively modify comparisons of the external access addresses of the external instruction access requirement and the external data access requirement with the previous external access address stored in the first memory means.

5. The bus controller according to claim 4, wherein said second memory means is a programmable memory device.

6. The bus controller according to claim 3, further comprising, pre-fetch address generating means for generating, as a pre-fetch address, an external access address calculated by incrementing a previous external access address memorized in said first memory means by a predetermined value;

pre-fetch means for pre-fetching information from the external memory device stored at the pre-fetch address generated by said pre-fetch address generating means during a period when no external access requirements are issued;

third memory means for storing the information pre-fetched by said pre-fetch means;

second judging means for judging whether information stored in said third memory means corresponds to information requested by each of the plurality of external access requirements; and second control means for controlling, based on each judging result of said second judging means, the communication between the plurality of internal buses and said third memory means, by enabling the communication of an external access requirement requesting information judged to correspond to information stored in said third memory means to be processed with priority.

7. The bus controller according to claim 6, further comprising:

third comparison means for comparing an external access address corresponding to the external instruction access requirement with the pre-fetch address generated by said pre-fetch address generating means, to judge whether the information stored in said third memory means corresponds to the information requested by the external instruction access requirement, based on the comparison results; and fourth comparison means for comparing an external access address corresponding to the external data access requirement with the pre-fetch address generated by said pre-fetch address generating means, to judge whether the information stored in said third memory means corresponds to the information requested by the external data access requirement, based on the comparison results.

8. The bus controller according to claim 7, further comprising:

second bus interface means for controlling communication between said third memory means and the plurality of internal data buses; and second control means for controlling the communication of the information stored in said third memory means to an internal bus, wherein, regardless of each judged result of the first judging means, the information is communicated to the internal instruction bus upon determination of conformity at said third comparison means, and the information is communicated to the internal data bus upon determination of conformity at said fourth comparison means.

9. A data processor having a function of accessing, upon cache miss, an external memory device having a high speed access mode and a normal access mode via a single external bus, comprising:

a central processing unit for respectively outputting an instruction access requirement having an instruction address and a data access requirement having a data address;

an internal instruction bus for transmitting an instruction;

an internal data bus for transmitting a data;

an instruction cache for storing an instruction to be executed at said central processing unit and for issuing an external instruction access requirement upon a miss to an instruction access requirement outputted from said central processing unit;

a data cache for storing a data to be used at said central processing unit and for issuing an external data access requirement upon a miss to a data access requirement outputted from said central processing unit; and a bus controller for controlling communication of a signal between the external bus and one of said internal instruction bus and said internal data bus, wherein said bus controller comprises:

first memory means for memorizing a previous external address indicating an address of an instruction or a data previously accessed from the external memory device;

first comparison means for comparing an instruction address regarding the external instruction access requirement with the previous external access address memorized in said first memory means, to judge whether the external memory device is accessible at the high speed access mode for an external instruction access requirement issued from said instruction cache;

second comparison means for comparing a data address regarding the external data access requirement with the previous external access address memorized in said first memory means, to judge whether the external memory device is accessible at the high speed access mode for an external data access requirement issued from said data cache;

selection means for selecting, as an external access address, one of an instruction address regarding the external instruction access requirement and a data address regarding the external data access requirement;

first bus interface means for governing communication of an instruction or a data between the external bus and one of the internal instruction bus and the internal data bus; and first access control means for controlling said selection means and said first bus interface means respectively by processing the external instruction access requirement prior to the external data access requirement upon conformity at only said first comparison means out of the first and the second comparison means when the external instruction access requirement and the external data access requirement are concurrently issued, and processing the external data access requirement prior to the external instruction access requirement otherwise.

10. The data processor according to claim 9, wherein a DRAM is employed as the external memory device and said bus controller further comprises second memory means for memorizing a bit width data indicating which bits of instruction address and the data address correspond to an address of the DRAM wherein the first comparison means and said second comparison means use the bit width data stored in the second memory device to respectively modify comparisons of the instruction address of the external instruction access requirement and the data address of the external data access requirement with the previous external access address stored in the first memory means.

11. The data processor according to claim 10, wherein said second memory means is a programmable memory device.

12. The data processor according to claim 9, wherein said bus controller further comprises:

pre-fetch address generating means for generating, as a pre-fetch address, an address calculated by incrementing a previous external access address memorized in said first memory means by a predetermined value;

pre-fetch means for pre-fetching an instruction or a data from said external memory device stored at the pre-fetch address generated by said pre-fetch address generating means during a period when none of the external instruction access requirement and the external data access requirements is issued;

third memory means for storing an instruction or a data pre-fetched by said pre-fetch means;

third comparison means for comparing an instruction address corresponding to the external instruction access requirement with the pre-fetch address generated by said pre-fetch address generating means, to judge whether the instruction or the data stored in said third memory means corresponds to the instruction requested by the external instruction access requirement issued from said instruction cache;

fourth comparison means for comparing a data address corresponding to the external data access requirement with the pre-fetch address generated by said pre-fetch address generating means, to judge whether the instruction or the data stored in said third memory means corresponds to the information requested by the external data access requirement issued form said data cache;

second bus interface means for controlling communication between said third memory means and one of the internal instruction bus and the internal data bus; and second access control means for controlling said second bus interface means to communicate the instruction stored in said third memory means to said internal instruction bus regardless of the compared results of said first comparison means and said second comparison means upon determination of conformity at said third comparison means and to communicate the data stored in said third memory means to said internal data bus regardless of the compared results of said first comparison means and said second comparison means upon determination of conformity at said fourth comparison means.

* * * * *